United States Patent
Wang et al.

(10) Patent No.: US 10,673,921 B2
(45) Date of Patent: Jun. 2, 2020

(54) METHOD AND SYSTEM FOR AUTOMATIC USER QUALITY-OF-EXPERIENCE MEASUREMENT OF STREAMING VIDEO

(71) Applicant: SSIMWAVE Inc., Waterloo (CA)

(72) Inventors: Zhou Wang, Waterloo (CA); Zhengfang Duanmu, Richmond Hill (CA)

(*) Notice: Subject to any disclaimer, the term of this patent is extended or adjusted under 35 U.S.C. 154(b) by 0 days.

(21) Appl. No.: 16/091,473

(22) PCT Filed: Mar. 6, 2017

(86) PCT No.: PCT/CA2017/050299
§ 371 (c)(1),
(2) Date: Oct. 4, 2018

(87) PCT Pub. No.: WO2017/152274
PCT Pub. Date: Sep. 14, 2017

(65) Prior Publication Data
US 2019/0158564 A1   May 23, 2019

Related U.S. Application Data (60) Provisional application No. 62/304,318, filed on Mar. 6, 2016.

(51) Int. Cl.
*G06F 15/16* (2006.01)
*H04L 29/06* (2006.01)
(Continued)

(52) U.S. Cl.
CPC .......... *H04L 65/80* (2013.01); *H04L 41/5067* (2013.01); *H04L 65/608* (2013.01);
(Continued)

(58) Field of Classification Search
CPC ... H04L 65/80; H04L 65/608; H04L 41/5067; H04L 41/509; H04N 21/2402;
(Continued)

(56) References Cited

U.S. PATENT DOCUMENTS

2011/0093605 A1   4/2011   Choudhury et al.
2012/0117225 A1   5/2012   Kordasiewicz et al.
(Continued)

FOREIGN PATENT DOCUMENTS

CA    2915446        12/2014
CN    103959798      7/2014
(Continued)

OTHER PUBLICATIONS

Xue et al, "Assessing quality of experience for adaptive HTTP video streaming", Aug. 9, 2014 (Year: 2014).*
(Continued)

*Primary Examiner* — Ryan J Jakovac (57) ABSTRACT

Disclosed are system and method that automate measurement of end users' quality-of-experience (QoE) when perceiving the video being streamed to the users' viewing devices. The overall user QoE is measured and computed by combining the instantaneous presentation quality, the playback smoothness quality, and the interactions between them. Prediction accuracy is thus significantly improved. The instantaneous and end-of-process QoE measures created by the system and method described are suitable for the monitoring and optimization of media streaming systems and services.

33 Claims, 6 Drawing Sheets

(51) Int. Cl.
  H04N 21/24 (2011.01)
  H04L 12/24 (2006.01)
  H04N 21/238 (2011.01)
(52) U.S. Cl.
  CPC ..... H04N 21/238 (2013.01); H04N 21/23805 (2013.01); H04N 21/2401 (2013.01); H04N 21/2402 (2013.01); *H04L 41/509* (2013.01); *H04N 21/24* (2013.01)
(58) Field of Classification Search
  CPC .. H04N 21/24; H04N 21/2401; H04N 21/238; H04N 21/23805
  See application file for complete search history.

(56) References Cited

U.S. PATENT DOCUMENTS

| | | | |
|---|---|---|---|
| 2012/0278441 | A1 | 11/2012 | Li et al. |
| 2013/0263167 | A1 | 10/2013 | Parthasarathy et al. |
| 2013/0290492 | A1 | 10/2013 | ElArabawy et al. |
| 2014/0019593 | A1 | 1/2014 | Reznik et al. |
| 2014/0201324 | A1 | 7/2014 | Zhang et al. |
| 2014/0219088 | A1 | 8/2014 | Oyman |
| 2014/0280679 | A1 | 9/2014 | Dey et al. |
| 2015/0067184 | A1 | 3/2015 | Parthasarathy |
| 2015/0135245 | A1* | 5/2015 | Dunne ............ H04N 17/004 725/109 |
| 2016/0050241 | A1 | 2/2016 | Lotfallah et al. |
| 2016/0050246 | A1 | 2/2016 | Liao et al. |

FOREIGN PATENT DOCUMENTS

| | | |
|---|---|---|
| EP | 2530870 | 12/2012 |
| WO | 2013059930 | 5/2013 |
| WO | 2014096463 | 6/2014 |

OTHER PUBLICATIONS

Wang Zhou et al: "Objective video presentation QoE predictor for smart adaptive video streaming", Visual Communications and Image Processing; Jan. 20, 2004-Jan. 20, 2004; San Jose,, vol. 9599, Sep. 22, 2015 (Sep. 22, 2015), pp. 95990Y-1 to 95990Y-13.
T. Stockhammer, "Dynamic adaptive streaming over HTTP: standards and design principles," in Proceedings of the second annual ACM conference on Multimedia systems. 2011, pp. 133-144.
Z. Wang, A. Bovik, H. Sheikh, and E. Simoncelli, "Image quality assessment: from error visibility to structural similarity," IEEE Trans. Image Processing, vol. 13, No. 4, pp. 600-612, Apr. 2004.
Z. Wang, E. P. Simoncelli, and A. C. Bovik, "Multiscale structural similarity for image quality assessment," in Proc. IEEE Asilomar Conf. on Signals, Systems, and Computers, vol. 2, Nov. 2003, pp. 1398-1402.
K. Seshadrinathan and A. Bovik, "Motion tuned spatio-temporal quality assessment of natural videos," IEEE Trans. Image Processing, vol. 19, No. 2, pp. 335-350, Feb. 2010.
M. Pinson and S. Wolf, "A new standardized method for objectively measuring video quality," IEEE Trans. Broadcasting, vol. 50, No. 3, pp. 312-322, Sep. 2004.
A. Rehman, K. Zeng, and Z. Wang, "Display device-adapted video quality-of-experience assessment," in Proc. SPIE, vol. 9394, Feb. 2015, pp. 939 406-939 406.
D. Rodriguez, J. Abrahao, D. Begazo, R. Rosa, and G. Bressan, "Quality metric to assess video streaming service over TCP considering temporal location of pauses," IEEE Trans. Consumer Electronics, vol. 58, No. 3, pp. 985-992, Aug. 2012.
J. Xue, D.-Q. Zhang, H. Yu, and C. W. Chen, "Assessing quality of experience for adaptive HTTP video streaming," in Proc. IEEE Int. Conf. Multimedia and Expo Workshops, Jul. 2014.
M. Garcia, D. Dytko, and A. Raake, "Quality impact due to initial loading, stalling, and video bitrate in progressive download video services," in Proc. IEEE tnt. Conf. Multimedia and Expo, Sep. 2014, pp. 129-134.
K. Seshadrinathan and A. Bovik, "Temporal hysteresis model of time varying subjective video quality," in Proc. IEEE Int. Conf. Acoust., Speech, and Signal Processing, May 2011, pp. 1153-1156.
Z. Wang and A. C. Bovik, "Mean squared error: love it or leave it? a new look at signal fidelity measures," IEEE Signal Processing Magazine, vol. 26, No. 1, pp. 98-117, Jan. 2009.
Z. Wang, H. R. Sheikh, and A. C. Bovik, " Objective video quality assessment," in The handbook of video databases: design and applications, pp. 1041-1078, Sep. 2003.
Z. Wang and A. C. Bovik, "Reduced- and no-reference image quality assessment: The natural scene statistic model approach," IEEE Signal Processing Magazine, vol. 28, pp. 29-40, Nov. 2011.
K. Seshadrinathan, R. Soundararajan, A. C. Bovik, and L. K. Cormack, "Study of subjective and objective quality assessment of video," IEEE Trans. Image Processing, vol. 19, No. 6, pp. 1427-1441, Jun. 2010.
P. Kumar, M. U. Kalwani, and M. Dada, "The impact of waiting time guarantees on customers' waiting experiences," Marketing science, vol. 16, No. 4, pp. 295-314, Nov. 1997.

* cited by examiner

METHOD AND SYSTEM FOR AUTOMATIC USER QUALITY-OF-EXPERIENCE MEASUREMENT OF STREAMING VIDEO

FIELD OF INVENTION

The invention relates generally to the field of streaming video to end users. In particular, the invention relates to a method and system for automating user quality-of-experience measurement of streaming video signals.

BACKGROUND OF INVENTION

In the past decade, there has been a tremendous growth in streaming media applications, thanks to the fast development of network services and the remarkable growth of smart mobile devices. For instance, in the field of over-the-top (OTT) video delivery, several methods, such as HTTP Live Streaming (HLS), Silverlight Smooth Streaming (MSS), HTTP Dynamic Streaming (EDS), and Dynamic Adaptive Streaming over HTTP (DASH), achieve decoder-driven rate adaptation by providing video streams in a variety of bitrates and breaking them into small HTTP file segments. The media information of each segment is stored in a manifest file, which is created at server and transmitted to client to provide the specification and location of each segment. Throughout the streaming process, the video player at the client adaptively switches among the available streams by selecting segments based on playback rate, buffer condition and instantaneous TCP throughput. With the rapid growth of streaming media applications, there has been a strong demand of accurate Quality-of-Experience (QoE) measurement and QoE-driven adaptive video delivery methods.

Due to the increasing popularity of video streaming services, users are continuously raising their expectations on better services. There have been studies or surveys to investigate user preferences on the type of video delivery services, which tend to show a dominating role of QoE in the user choice over other categories such as content, timing, quality, ease-of-use, portability, interactivity, and sharing. Significant loss of revenue could be attributed to poor quality of video streams. It is believed that poor streaming experience may become a major threat to the video service ecosystem. Therefore, achieving optimal QoE of end viewers has been the central goal of modern video delivery services.

As the humans are the ultimate receiver of videos in most applications, subjective evaluation is often regarded as the most straightforward and reliable approach to evaluate the QoE of streaming videos. A comprehensive subjective user study has several benefits. It provides useful data to study human behaviors in evaluating perceived quality of streaming videos; it supplies a test set to evaluate, compare and optimize streaming strategies; and it is useful to validate and compare the performance of existing objective QoE models. Although such subjective user studies provide reliable evaluations, they are often inconvenient, time-consuming and expensive. More importantly, they are difficult to be applied in any real-time playback scheduling framework. Therefore, highly accurate, low complexity, objective measures are desirable to enable efficient design of quality-control and resource allocation protocols for media delivery systems. However, many known methods are designed to measure presentation quality (or picture quality) only or the impact of initial buffering and playback stalling only. In practice, existing systems often rely on bitrate and global statistics of stalling events for QoE prediction. This is problematic for at least two reasons. First, using the same bitrate to encode different video content can result in drastically different presentation quality. Second, the interactions between video presentation quality and network quality are difficult to account for or simply not accounted for in some of these known methods.

The forgoing creates challenges and constraints for making objective QoE measurement, in real time, and for large number of end users. There is therefore a need for a method and system for automating user quality-of-experience measurement of streaming video signals as compared to the existing art. It is an object of the present invention to mitigate or obviate at least one of the above mentioned disadvantages.

SUMMARY OF INVENTION

The present invention relates in general to automating measurement of end users' quality-of-experience (QoE) when perceiving the video being streamed to the users' viewing devices. To automatically measure user QoE, the present invention combines the instantaneous presentation quality of the video (which is the picture quality of video frames visualized during smooth playback, that may be affected by lossy compression, noise, blur, spatial and temporal scaling, pre-processing, post-processing, transmission losses, etc., and may vary based on the viewing devices and viewing conditions at the users' end), the playback smoothness quality (which is the smoothness of the playback process, that may be affected by initial stalling due to buffering, stalling during playback, etc.), and the interactions between them.

The present invention attempts to provide an instantaneous objective QoE measurement method or system for general streaming video. Not only the presentation quality of the video and the playback smoothness quality are measured, the present invention is also to account for in such measurements the interactions between them, as will become clear in the following description.

In one embodiment of the present invention, the impact of playback smoothness quality i.e., the quality degradations, on the QoE is measured not only based on the (timing) positions or durations of stalling events, but also based on the presentation quality of the video frames where the stalling events occur. It is believed that this inclusion of interactions (i.e., dependencies) between the presentation quality and the play back smoothness quality leads to significantly more accurate measurement of user QoE. The instantaneous and end-of-process QoE measures obtained according to the present invention may offer significant advantages in monitoring and optimization of media streaming systems and services as compared to other methods.

In a first aspect of the invention, there is provided a method of generating a quality-of-experience (QoE) measure of a streaming session of streaming video. The streaming video is transmitted from a video hosting server at server side to a user viewing device at receiver side over a network connection. The method comprises the steps of obtaining a presentation quality measure of the streaming video, tracking occurrences of all stalling events during the streaming session, obtaining a playback smoothness quality measure of the streaming video, the playback smoothness quality measure being assessed at the receiver side by combining contributions from all stalling events since the start of the streaming session, contribution from a stalling event being computed based on the presentation quality of the streaming video prior to the occurrence of the stalling event and memory effect and quality decay effect due to the occurrence of the past stalling event, and generating an instantaneous QoE score by combining the presentation quality measure and the playback smoothness quality measure.

As one feature, the method may further include the step of cumulating instantaneous QoE scores generated at all time positions since the start of the streaming session to obtain an overall end-of-process QoE score of the streaming session. As another feature, the contribution of the stalling event is computed based on the presentation quality measure of a video frame prior to the occurrence of the stalling event, and the video frame may be a fully rendered frame immediately prior to the occurrence of the stalling event. As yet another feature, the memory effect or the quality decay effect, or both, may be represented by a function, or functions, monotonically decreasing with and saturating over time.

As one other feature, the presentation quality measure is obtained from a full-reference video quality assessment method that compares quality of a test video generated from an original source of the streaming video with that of the original source video as a reference, or obtained from a no-reference video quality assessment method that requires no access to the original source video, and the video quality assessment method may be adapted to the user viewing device and viewing conditions of an end user.

As yet one other feature, the playback smoothness quality measure is evaluated utilizing time positions and durations of initial buffering and playback stalling events. As a further feature, the degradation of playback smoothness quality caused by the stalling event, whether due to initial buffering or playback stalling, is evaluated according to a model in which the degradation increases with the presentation quality measure of the last rendered video frame prior to the stalling event. Furthermore, the degradation caused by the stalling event may be selected to be proportional to the presentation quality measure of the last rendered video frame.

In another aspect of the invention, there is provided a system for measuring user quality-of-experience (QoE) of streaming video that is transmitted from a video hosting server at server side to a user viewing device at receiver side over a network connection. The system comprising a presentation quality assessment unit, the presentation quality assessment unit generating or obtaining a presentation quality measure of the streaming video; a playback smoothness quality assessment unit, the playback smoothness quality assessment unit tracking occurrences of all stalling events during a streaming session and generating a playback smoothness quality measure of playback smoothness quality perceived at the user viewing device playing back the streaming video, wherein the generation of the smoothness quality measure combines contributions from all stalling events since the start of the streaming session, contribution from a stalling event being computed based on the presentation quality of the streaming video prior to the occurrence of the stalling event and memory effect and quality decay effect due to the occurrence of the past stalling event; and a QoE assessment unit, the QoE assessment unit combining the presentation quality measure and the playback smoothness quality measure into an instantaneous QoE score.

In yet another aspect, there is provided a non-transitory computer-readable medium having stored thereon computer readable code that when executed by a processor of a computing device, causes the computing device to perform a method of measuring user quality-of-experience of streaming video, according to any one of the methods outlined above.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which.

DETAILED DESCRIPTION OF EMBODIMENTS

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

The present invention in general relates to automating measurement of end users' quality-of-experience (QoE) when perceiving the video being streamed to the users' viewing devices. To automatically measure user QoE, the present invention combines the instantaneous presentation quality of the video, the playback smoothness quality and the interactions between them. Here QoE refers to the overall viewer satisfaction of the playback experience of the video stream transmitted from the video hosting server through the network to the viewer's receiving and display device. QoE is centralized on human experience at the end of the video delivery chain, and may be measured either by human scoring or by objective models that predict human scoring. QoE is different from the concepts of quality-of-service (QoS) or quality-of-delivery (QoD), which focuses on the service level and stability of the video transmission process through the network, and is often measured by network service and performance parameters such as bandwidth, bit error rate, packet loss rate, and transmission delay.

Figure 1:
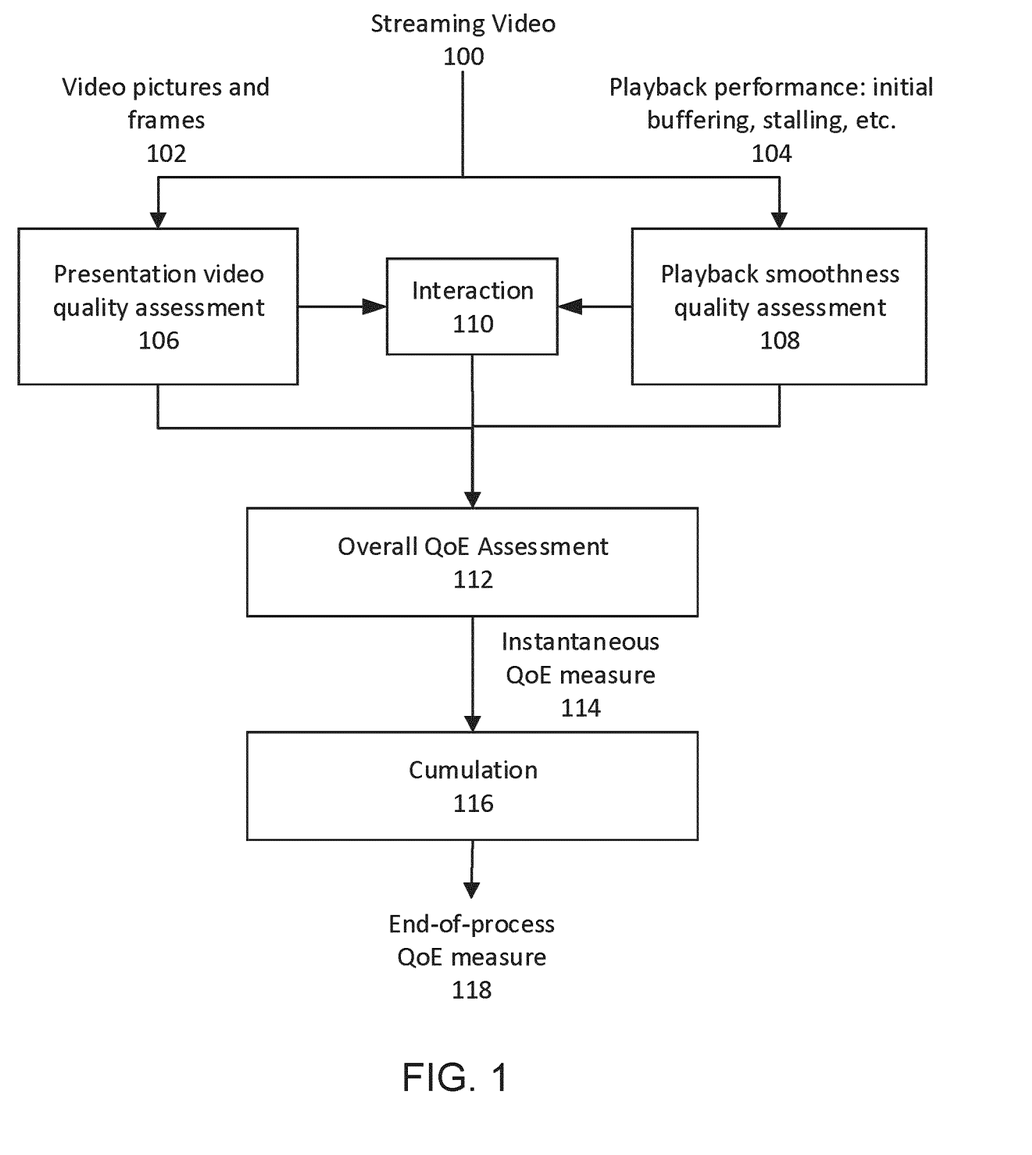
FIG. 1 is a diagram showing a process of automatically measuring the streaming video QoE.

FIG. 1 is a diagram showing a process of automatically measuring the streaming video QoE. This process utilizes a unified QoE measurement approach that incorporates the video presentation quality, the playback smoothness quality and the interactions between them. During playback of the streaming video 100, two types of information are extracted from the streaming video signal. The first type 102 of information includes the decoded and processed video pictures/frames sent to the playback engine; and the other type 104 generally includes the playback performance parameters, such as the duration of initial buffering, the positions and durations of stalling events, among others. The presentation quality of the video is evaluated using video quality assessment methods 106, which evaluation may be performed picture by picture (or frame by frame), and the playback smoothness quality 108 is also measured or assessed. These two measures are not independent. For example, the presentation quality of a video frame presented during a stalling event may affect the level of quality degradations caused by the stalling event. The interrelationship between these two quality measures is represented by an interaction 110 in FIG. 1, which will be described in detail later. The overall instantaneous QoE measure or assessment 112 at each frame is obtained by combining the presentation quality measurement and playback smoothness quality measurement, together with the impact of the interaction between them. The instantaneous overall QoE measures 114 obtained at all past frames are cumulated 116 to finally create an end-of-process QoE measure 118. This process is further explained below.

Figure 2:
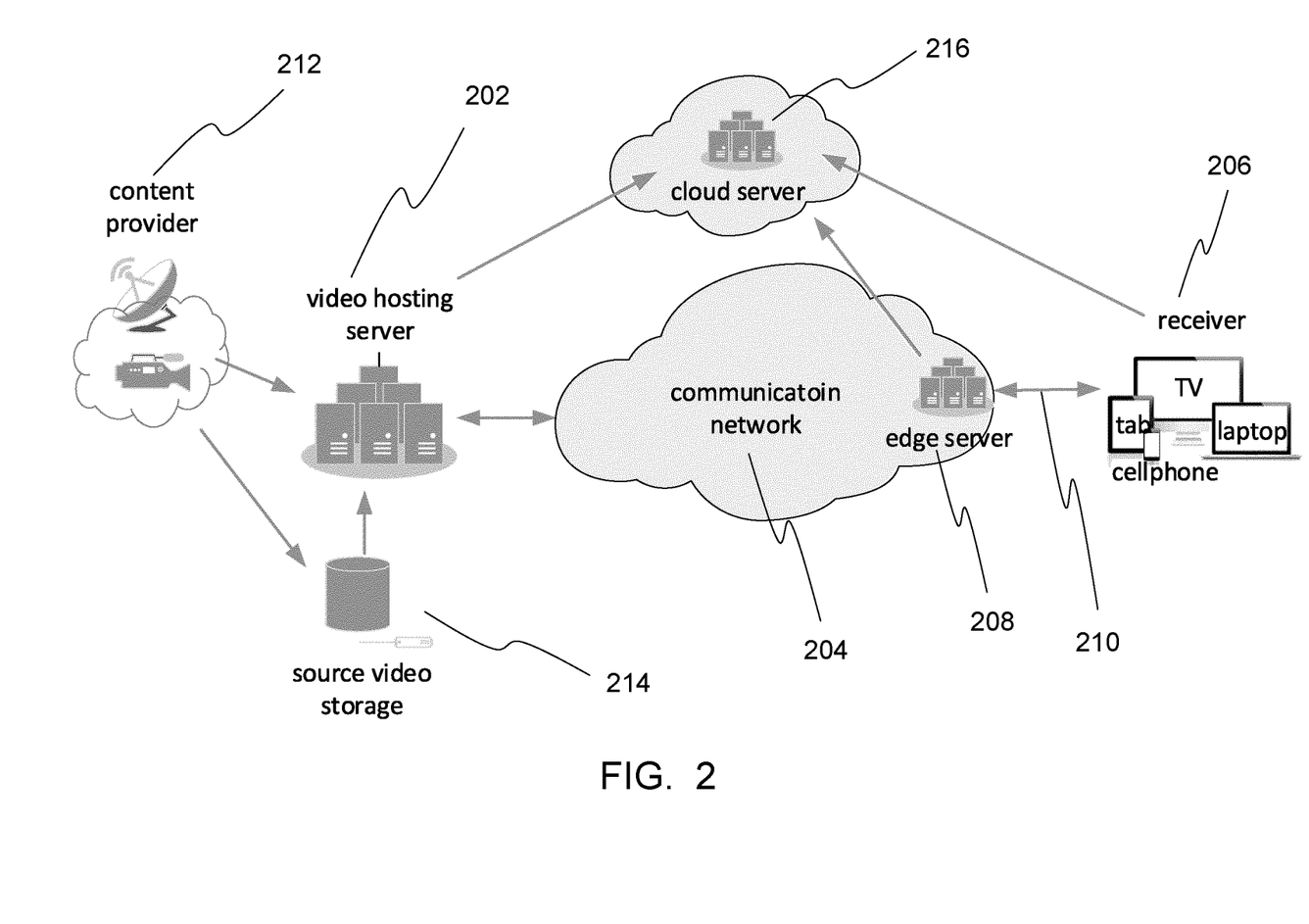
FIG. 2 provides an illustrative example, in which streaming video is shown to be transmitted from a video hosting server to a user display device over a communication network, optionally assisted by an edge server; A server in the cloud may collect information from the video hosting server, the edge server and/or the user display device.

First, reference is made to FIG. 2. Before describing this process in detail, it will be appreciated that as a streaming video is being transmitted from a video hosting server 202 at server side over a network connection 204 to a playback viewing device or receiver 206 at receiver side, the video presentation quality may be measured at either the server side such as by video hosting server 202 or at the receiver side such as by the playback viewing device 206. For certain network configurations, this also may be measured at an edge server 208, which is a video server used by a local service provider for connecting to playback devices directly served by the local service provider. The connection 210 between the edge server 208 and the receiver 206 generally is the final link between the receiver 206 and the network, though additional links may exist. On the other hand, the playback smoothness quality is measured at receiver 206, not at the video hosting server 202. The playback smoothness quality may also be measured at a server connected to the network, such as a dedicated QoE server, a cloud server, or the edge server 208, to approximate what may be measured at the receiver. For example, the playback viewing device may send relevant information (such as stalling starting points and durations) to a server 216 in the cloud, and the playback smoothness quality may be measured at the cloud server 216. These may be desirable sometimes because an edge server or cloud server may be equipped with computation power far superior than that is available at a playback device and may be configured to receive playback status information from individual playback devices as feedback and to measure (therefore monitor) playback smoothness quality at all playback devices connected to the edge server or configured to be monitored by the cloud server.

Now, referring back to FIG. 1, for each frame in the streaming video, its instantaneous video presentation quality measure $P_n$ may be estimated at the server side by a frame-level presentation video quality assessment (VQA) method before transmission. Either full-reference or no-reference VQA methods may be employed. In the case of full-reference VQA, the presentation quality measure is obtained from a full-reference video quality assessment method that compares quality of a test video generated from an original source of the streaming video with that of the original source video as a reference. The instantaneous video presentation quality measure may be expressed as a function of current frames of both the streaming video and the pristine quality video:

$$P_n = V_{FR}(R_n, X_n), \quad (1)$$

where $R_n$ and $X_n$ are the n-th frames of the pristine quality video (such as the source video that is received from a video content provider 212 or stored in the data storage device 214 of the video hosting server 202) and the streaming video transmitted by the server, respectively, and VFR(•) is a full-reference VQA operator. In the case of no-reference VQA, the presentation quality measure is obtained from a no-reference video quality assessment method that requires no access to the original source video. The instantaneous video presentation quality measure may be expressed as a function of $X_n$ alone:

$$P_n = V_{NR}(X_n), \quad (2)$$

where $X_n$ is the n-th frame of the streaming video, and $V_{NR}(•)$ is a no-reference VQA operator.

Any VQA method may be used for measuring the presentation quality. Some known examples include Peak signal-to-noise-ratio (PSNR), Structural similarity index (SSIM), Multi-scale structural similarity index (MS-SSIM), SSIMplus. For better performance, flexibility and usability of the overall QoE measurement method or system, one may use VQA or video QoE measurement method that is adapted to the user viewing device and viewing conditions of an end user. According to such VQA methods that have viewing device and viewing condition adaptability, the same video stream may be scored differently based on the viewing device and viewing environment condition when the video is being watched. For example, one may use full-reference VQA or full-reference video QoE measurement method that allows for cross-resolution measurement, i.e., when assessing the quality of the test video, the reference video used for comparison may have different spatial and/or temporal resolutions.

One example of such VQA or video QoE measurement method that may meet the requirements of viewing device/viewing condition adaptability and cross-resolution assessment is the SSIMplus method. This is a full-reference VQA method. A source pristine quality video is used as a reference to evaluate the quality of a test streaming video generated from the source video, e.g., through compression, which is also to be to be streamed to users. SSIMplus measures the structural fidelity of the test video against the reference video, which may be useful to capture local distortions such as blurring effect caused by imperfection of coding methods, especially at low bit rate, and predicts the perceived quality degradation of the test video. The prediction may employ different computational vision science models, the selection of which may affect the accuracy of the prediction. An overall quality prediction of the test video is generated. In addition, SSIMplus also generates a quality map that indicates the video quality at every pixel location in every video frame. In general, computational vision models selected for SSIMplus take into account display device and viewing condition parameters such as viewing distance or angle, and physical size, spatial resolution (in terms of rows and columns of pixels) and brightness of the viewing display. As will be appreciated, visibility of local distortions, such as blurring effect caused by imperfection of a compression process of the streamed video, may depend on both display device and viewing condition parameters. For example, distortions highly visible on large-size, high definition TV display screens may become less visible or even invisible on displays with smaller physical sizes or lower resolutions (e.g., on a cellphone's screen). SSIMplus is also a VQA method that adapts to display devices and viewing conditions, and may incorporate human visual sensitivity models, which predicts (i.e., estimates) presentation quality by taking into account not only video content, but viewing condition parameters such as viewing distance and angle, and display device parameters such as physical sizes, spatial resolution, luminance of the display device, among others.

If the quality scores or measures are computed at the server 202 side, after they are computed, they are transmitted to the receiver 206 along with the video contents, or transmitted through a separate channel between the server 202 and receiver 206. The computed quality scores $P_n$'s can either be embedded into the manifest file that describes the specifications of the video, carried in the metadata of the video container. The manifest or metadata file is transmitted to the receiver side such that its information is available to the receiver. When stalling occurs, the receiver 206 temporarily receives no video signal or only incomplete video signal from the server, or the decoding/display speed of the receiver 206 does not match that of video playback. As a result, the receiver can present either the last successfully decoded frame or a partially decoded frame. In commonly used streaming protocols such as MPEG-DASH, the partially decoded frame will not be sent for rendering, and thus viewers will see the last successfully decoded frame during the stalling interval.

For a stalling moment n in the interruption period [i,j], one way of representing the video presentation quality at the instance n, i.e., $P_n$, is to use the quality measure of the last decoded frame immediately before the stalling $P_{i-1}$, $$P_n = P_{i-1} \quad (3)$$

This quality measure $P_{i-1}$ will be repeated for all time positions (i.e., all frames within the period [i,j]) until the stalling is over. Of course, video presentation quality at a stalling moment n in the interruption period also may be represented by other quantities from presentation quality measures obtained or computed prior to the stalling, such as some average or even using that of a partially decoded frame, as appropriate.

Each stalling event may be separately analyzed and the overall effect may be computed by aggregating them. Note that each stalling event divides the streaming session time line into three intervals, i.e., the time intervals before the stalling, during the stalling, and after the stalling. For convenience, these three intervals are often selected as non-overlapping. These three intervals can be analyzed separately because the impact of the stalling event on each of the intervals is different. The playback smoothness quality measure may be evaluated utilizing time positions and durations of initial buffering and playback stalling events. This is further described in the following example.

First, one may assign zero penalty to the frames before the stalling occurs when viewers have not experienced any interruption. Second, as a playback stalling starts, the level of dissatisfaction increases as the stalling goes on till playback resumes. It will be appreciated that the impact of waiting time on user experience in queuing services has an economic as well as a psychological perspective. In other words, the stalling impact is represented by a function that is monotonically decreasing over time (i.e., more negative experience as the stalling continues) and saturates over time as well. Exponential decay may be used to approximate such QoE loss saturation over time due to the number and length of stalling. In other words, QoE loss due to a stalling event may be approximated by an exponential decay function. Third, QoE also depends on a behavioral hysteresis "after effect". In particular, a previous unpleasant viewing experience caused by a stalling event tends to penalize the QoE in the future and thus affects the overall QoE. The extent of dissatisfaction starts to fade out at the moment of playback recovery because observers start to forget the annoyance. This decline of memory retention of the buffering event is generally monotonic over time. The effect of such decline may be included in the measurement and calculation of the impact of the stalling event by using the Hermann Ebbinghaus forgetting curve, $$M = \exp\left\{-\frac{t}{T}\right\}, \quad (4)$$

where M is the memory retention, T is the relative strength of memory, and t is time.

Assume that the k-th stalling event locates at the interval $[i_k, i_k+l_k]$, where $l_k$ is the length of stall. One may use a piecewise model to measure the impact of each stalling event on QoE, or a change in QoE score due to stalling $$S^k(t) = \begin{cases} Qd(t), & \frac{i_k}{f} \le t \le \frac{i_k+l_k}{f} \\ Qd\left(\frac{i_k+l_k}{f}\right)m(t), & t > \frac{i_k+l_k}{f} \\ 0, & \text{otherwise} \end{cases} \quad (5)$$

where $S^k(t)$ represents the change in QoE score due to the k-th stalling event at time t, f is the frame rate in frames/second, d(t) is a quality decaying function that increases with the length of the stalling event (i.e., $l_k$), m(t) is a memory function that measures the lasting impact of the k-th stalling event after the event ends, and Q is a scaling coefficient of the decaying function that will become clear in the following description.

As a non-limiting example, for the purpose of illustration but not limitation, the time variation of quality decaying function d(t) and memory function m(t) may be expressed as exponential functions given by $$d(t) = -1 + \exp\left\{-\left(\frac{tf - i_k}{T_0}\right)\right\} \text{ and } m(t) = \exp\left\{-\left(\frac{tf - i_k - l_k}{T_1}\right)\right\}$$

where $T_0$ and $T_1$ represent the rate of dissatisfaction and the relative strength of memory, respectively.

The scaling coefficient for the decay function, Q, may be computed from the presentation quality of all frames prior to the stalling, i.e. up to time (or frame) $i_k-1$. The presentation quality may be computed using Equations (1), (2), and (3), for example. As a non-limiting example, for the purpose of illustration but not limitation, the scaling coefficient may be computed by $$Q = P_{i_k-1}$$

This scaling coefficient of the decay function has two functions: 1) it reflects the viewer expectation to the future video presentation quality, and 2) it normalizes the stalling effect to the same scale of VQA kernel. This formulation is qualitatively consistent with the relationship between the two QoE factors previously discussed. It will be appreciated that this selection and use of $P_{i_k-1}$ is a particular example. In general, any suitable scaling coefficient that appropriately describes or represents the presentation quality prior to the stalling may be used, which may be that of a particular frame prior to the stalling, such as immediately prior to the stalling, or of an average of several frames prior to the stalling, or even of a score that represents a longer period prior to the stalling. Further, because of the use of a scaling coefficient, the decay effect, as jointly represented by the decay function and the scaling coefficient, varies with the presentation quality, and in particular, is proportional with the presentation quality score prior to the installing. It will be appreciated that more generally, the degradation increases with the presentation quality measure prior to the stalling event and that a measure of presentation quality prior to the stalling, such as that of a particular frame or an average of several frames, may be incorporated into such a model or expression for quality decay effect or the change in QoE score (i.e., the drop in QoE).

In addition, since the impact of initial buffering and stalling during playback are different, two sets of parameters are used, namely $\{T_o^{init}, T_1^{init}\}$ for initial delay and $\{T_0, T_1\}$ for other playback stalls, respectively. For simplicity, the initial expectation $P_0$ is selected as a constant. In this way, the initial buffering time is proportional to the cumulated experience loss.

Figure 3:
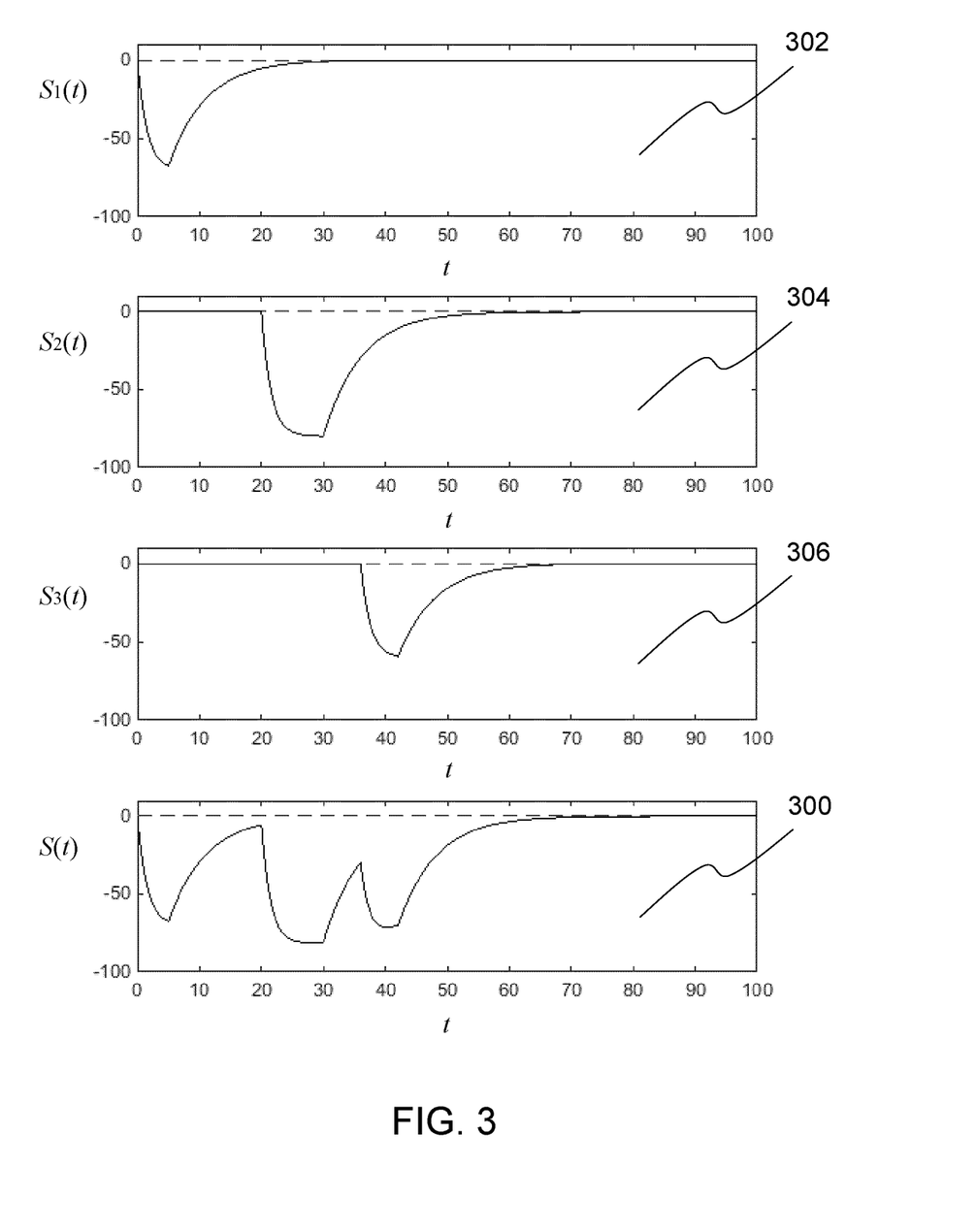
FIG. 3 provides an illustrative example to show the effects of three stalling events to the overall QoE drop.

Hysteresis influence of all stalling events (past and current) reduces the instant QoE. This instant QoE drop due to all stalling events may be approximated by aggregating all QoE drops caused by each stalling events. An expression to account for this aggregation of drops due to all stalling events may be in the form $$S(t) = \Sum_{k=1}^{N} S^k(t), \quad (6)$$

where N is the total number of stalling events since the start of the streaming session. This is illustrated in FIG. 3, which illustrates the overall QoE drop S(t) shown in panel 300 due to the joint contributions from a first QoE drop $S_1(t)$ shown in panel 302 caused by the first stalling, a second QoE drop $S_2(t)$ shown in panel 304 caused by the second stalling, and a third QoE drop $S_3(t)$ shown in panel 306 caused by the third stalling.

Another factor that affects the overall QoE is how frequently stalling occurs. It is known that the frequency of stalling negatively correlates with QoE for a streaming video of a fixed total length of stalling L. To account for the frequency of stalling, the parameters of $\{T_0, T_1\}$ may be selected to satisfy $T_1 > T_0$. With such parameter selection, the trends of the effect of stalling frequency are well captured by the piecewise model and the quality decaying function d(t) and memory function m(t) described above.

In certain applications, it is desirable to measure the impact of stalling at individual frames. To do so, one may convert the continuous function in Eq. (5) into its discrete form by sampling the function every 1/f second at each discrete time instance n:

$$S_n = S\left(\frac{n}{f}\right). \quad (9)$$

In this discrete form, the instantaneous QoE at each time unit n in the streaming session may be represented as the aggregation of the two channels, i.e., the video quality assessment channel 106 (or $P_n$) and the playback smoothness quality channel 108 (or $S_n$), as follows:

$$Q_n = P_n + S_n(P_1, P_2, \ldots, P_n) \quad (10)$$

Here the impact of presentation quality $P_n$ and degradation due to playback smoothness quality $S_n$ on the overall QoE are not simply additive. Because the effects of decaying d(t) and memory m(t) (i.e., impacts of all past events) in the computation of degradation impact of playback smoothness quality $S_n$ are both modulated by the presentation quality P (as in Eq. (5)), these two channels are dependent and interrelated. For example, the degradation impact of playback smoothness quality $S_n$ may be dependent on the current and previous presentation quality $P_1, P_2, \ldots, P_n$. Thus, although Eq. (10) may show on its face the addition of contributions from merely two channels, the contributions from the interaction between these two channels are included in the decaying and memory contributions from all past events. It is the dependency of playback smoothness quality $S_n$ on the current and previous presentation quality and the joint effects of playback smoothness quality and presentation quality on the QoE (or rather, its drop) that form the interaction between the playback smoothness quality and the presentation quality.

Figure 4:
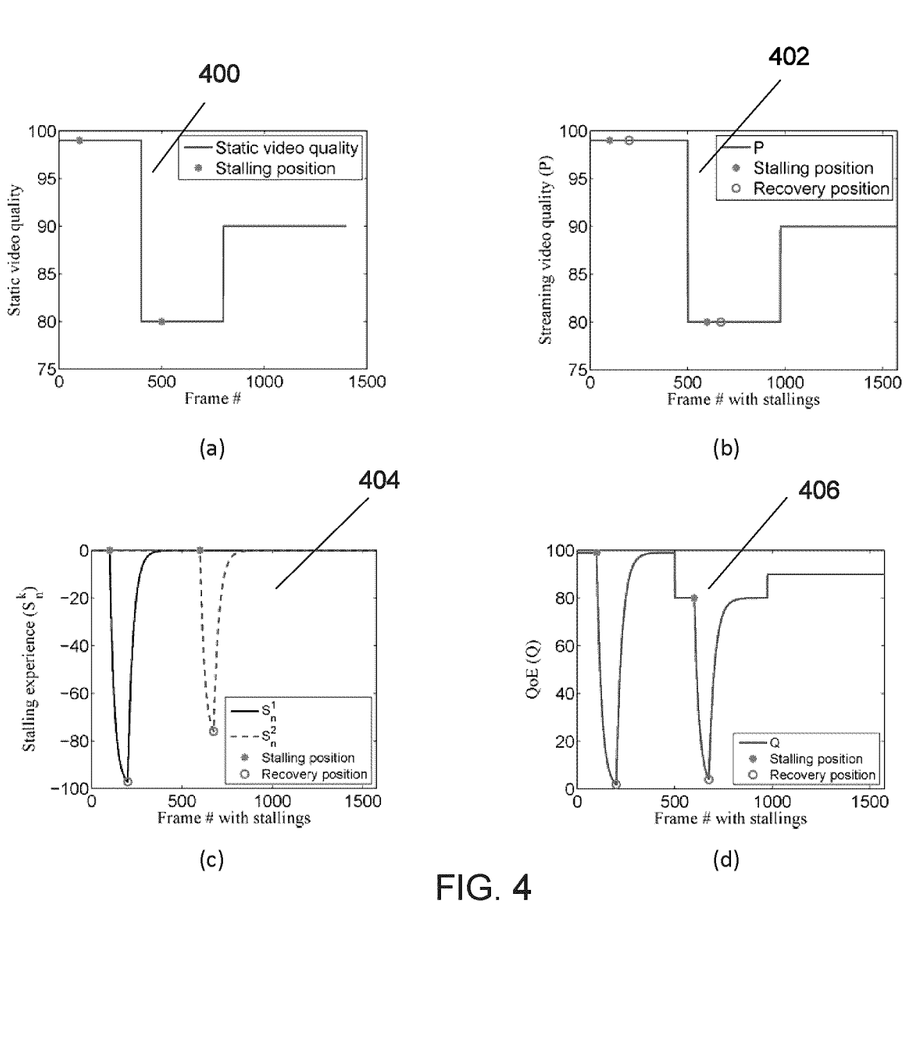
FIG. 4 provides an illustrative example, to illustrate the impact of stalling and video presentation quality to the overall QoE at each time instance during playback.

In practice, one often requires a single end-of-process QoE measure. The mean value of the predicted QoE over the whole playback duration may be used to evaluate the overall QoE. The end-of-process QoE at the current time may be computed using an moving average method:

$$A_n = \frac{(n-1)A_{n-1} + Q_n}{n}, \quad (11)$$

where $A_n$ is the cumulative QoE up to the n-th time instance in the streaming session. An illustrative example is shown in FIG. 4. In FIG. 4(a) is shown in solid line a curve representing the video presentation quality of the static video 400 at each frame, in which '*' indicates the position of stalling. The video presentation quality of the streaming video during playback at each frame 402 is shown in FIG. 4(b), in which indicates the position of stalling and 'o' indicates the position of recovery. The QoE drop 404 due to each stalling events at each frame is shown in FIG. 4(c). In FIG. 4(c), the solid curve shows the QoE drop due to initial buffering and the dashed curve shows the QoE drop due to playback stalling. The overall QoE 406 at each time instance during playback is illustrated in FIG. 4(d) for comparison.

Now, referring back to FIG. 1 again. To obtain a single end-of-process QoE measure, cumulation 116 is to combine all instantaneous QoE measures 114 produced in all prior frames (or time units) into a single end-of-process QoE measure to represent the overall QoE score of the streaming video over the duration being monitored by the process shown in FIG. 1. One way of combining these instantaneous QoE measures is to cumulate them and compute a moving average of the instantaneous QoE measures, such as using the formula of Eq. (11).

Although in the examples described above, it is described that the assessment of smoothness quality and the assessment of QoE measures (or QoE scores) are performed at the receiver side, it will be appreciated that they are not restricted to being performed at a user display device. A user display device 206, having a computing hardware unit incorporated therein, may be used to perform these assessments. However, a user display device may have only limited computation power. These assessments may therefore be performed by an edge server 208 or a cloud server 216, which tends to be more computationally powerful than a user display device, which may be a handheld cellphone or a wearable display device. An edge server 208 or a cloud server 216 may be configured to perform one or more (or all) of the tasks of presentation quality assessment, playback smoothness quality assessment, instantaneous or overall QoE assessment, and end-of-process QoE assessment.

The edge server 208 may also be configured to receive and store device specific parameters of a display device, such as display parameters and viewing condition parameters, to a storage device of the edge server, to enable the edge server to perform VQA methods that adapt to display devices and viewing conditions of end users. Thus, for certain applications (for example to monitor and record the QoE scores for a large number of end user display devices), an edge server 208 may be configured to perform these assessments and measurements with viewing device and viewing condition adaptability.

The cloud server 216 may also be configured to receive and store information from the video hosting server 202, the edge server 208, and/or the display device 206. Such information may include results of full-reference VQA assessment performed at the video hosting server, and/or device specific parameters of a display device, such as display parameters and viewing condition parameters, to a storage device of the cloud server, to enable the cloud server to perform VQA methods that adapt to display devices and viewing conditions of end users. Thus, for certain applications (for example to monitor and record the QoE scores for a large number of end user display devices), a cloud server 216 may be configured to monitor a given list of display devices 206 and to perform these assessments and measurements with viewing device and viewing condition adaptability.

As will be understood, a server is generally a dedicated computer hardware unit having a processor that can execute computer instructions for computing the quality scores. A receiver may be a portable computing device, such as a portable computer, a tablet computer, a smart mobile telephone handset, a wearable display or viewing device, among others, that includes a computing hardware unit. The computing hardware unit may either execute computer instructions stored on its storage device or devices or received over a network connection from a remote location. When the instructions are executed by the computing hardware (or more particularly the microprocessor or microprocessors), the server or the receiver will compute the quality scores as described above.

Figure 5:
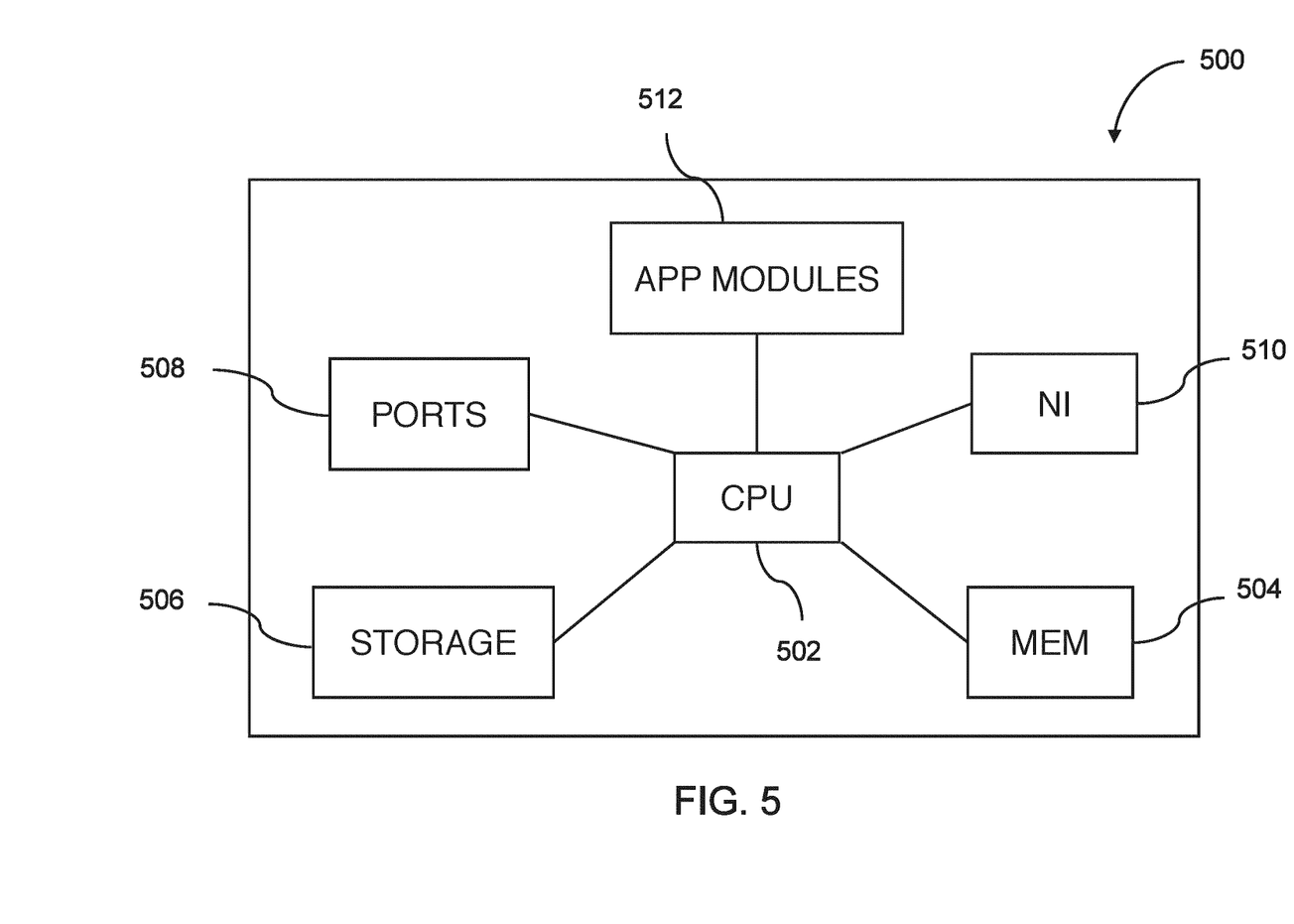
FIG. 5 provides a non-limiting example of a hardware computing unit.

More generally, a server or a receiver includes a hardware unit or units having executed thereon stored or received instructions (for ease of description, in the following it will be assumed that a server or a receiver has only a single hardware unit though the present invention is not limited to such single hardware unit configuration). The instructions may be stored on a storage device that forms part of or is connected to the hardware unit, or may be transmitted to the hardware unit for the duration of the execution of the instructions. A non-limiting example of a hardware unit is illustrated in FIG. 5. It will be understood that a hardware unit may include more components than those illustrated in FIG. 5, or less. Hardware unit 500 may be a server or computer or some hardware device with computation power, which often includes one or more microprocessors or CPUs 502 (central processing unit), one or more memory storage devices, such as a transient memory device 504 and a long-term storage device 506, some local and communication ports 508 for connection to local devices, a network interface 510 for connection to the communication network 204, and one or more application modules 512 executing on the microprocessor or CPU 502 for performing certain programmed functions. A hardware unit may have several application modules executing on its microprocessor or CPU concurrently. However, it will be clear from the context which application module is causing the microprocessor or CPU to perform a specific function (e.g., a VQA unit performing a quality assessment operation). Where the context may not uniquely identify a particular module or indicate whether it is the hardware unit itself that is being referenced, it will be identified explicitly in the description. Thus, the function as described being provided by an application module will be understood to be the same as being provided by the hardware unit, as programmed by the instructions of the program. Similarly, when a hardware unit is described to perform a function, it will be understood that the hardware unit performs the function as being configured by the instructions of an application module or modules stored or received. The instructions may be stored on a non-transitory physical medium or media, e.g., stored on the long term storage device 506, or received over a network connection at network interface 510. When the instructions are executed by the microprocessor or CPU 502, it causes the hardware unit to perform the functions (e.g., the VQA function) or the methods (e.g., the method of measuring QoE) as described herein.

Examples of the method of measuring QoE have been described in reference to FIG. 1. As will be appreciated, a computer hardware unit 500 (or several computer hardware units), when properly configured, for example by programming the microprocessor(s) or CPUs 502 using instructions stored or received, may be viewed as functional units arranged in a computer system for measuring the QoE.

Figure 6:
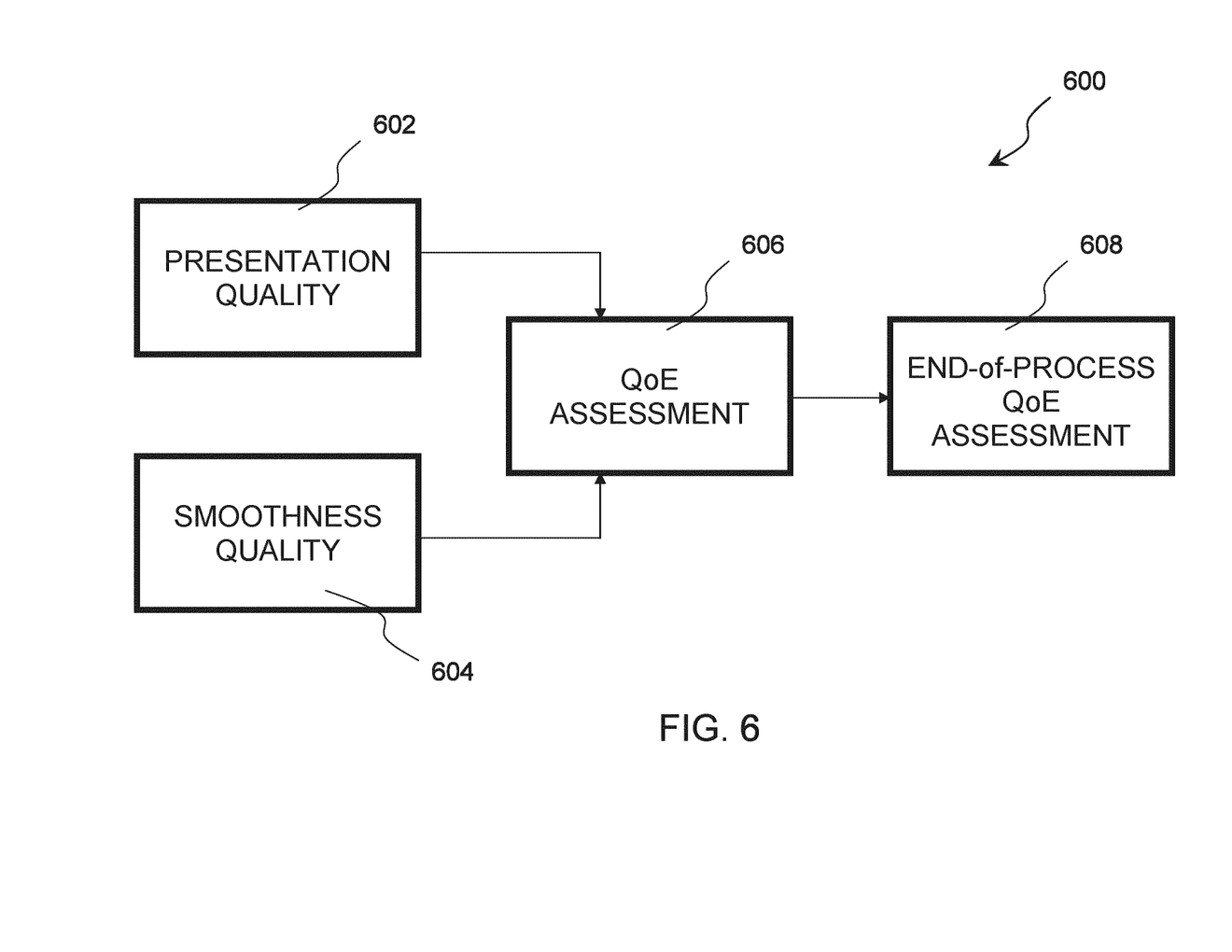
FIG. 6 provides an illustrative example showing a system for automatically measuring the streaming video QoE.

FIG. 6 is a diagram illustrating a computer system for measuring the QoE according to the present invention.

Referring to FIG. 6, system 600 has a presentation quality assessment unit 602, a playback smoothness quality assessment unit 604, a QoE assessment unit 606, and optionally an end-of-process QoE accumulation unit 608. The system 600, when configured and executing the process as described herein, measures the QoE of a streaming video, i.e., the input to the system, and generates as outputs an end-of-process QoE score or an instantaneous QoE score.

These units are connected by network connections (and/or data connections if they reside in the same hardware unit). These units may all reside in (i.e., be hosted by) the same hardware unit, or may each reside in a different hardware unit, or some of the units may reside in one hardware unit and the others reside in a different hardware unit. For example, the presentation quality assessment unit 602 may reside in (i.e., integrated with) the video hosting server 202, while the playback smoothness quality assessment unit 604, the QoE assessment unit 606, and the optional end-of-process QoE accumulation unit 608 may reside in the end user's display device 206. Or, the playback smoothness quality assessment unit 604, the QoE assessment unit 606, and the optional end-of-process QoE accumulation unit 608 may reside in (i.e., integrated with) the edge server 208 or the cloud server 216. Or, as a further alternative, the edge server 208 or the cloud server 216 may host all of the presentation quality assessment unit 602, the playback smoothness quality assessment unit 604, the QoE assessment unit 606, and the optional end-of-process QoE accumulation unit 608.

The presentation quality assessment unit 602 measures and produces a video presentation quality assessment of the streaming video $P_1, P_2, \ldots, P_n$ etc. for each of the video frames of the streaming video. The instantaneous video presentation quality measure $P_n$ may be estimated using any of the suitable video quality assessment methods 106 described with reference to FIG. 1. Separately, the playback smoothness quality assessment unit 604 tracks any stalling events experienced at a user display device, the instantaneous video presentation quality of fully or partially rendered frames, and produces (i.e., estimates) a smoothness quality measure $S^k_n$ that represents the smoothness quality (or, in fact, the degradation effect) at time n due to the k-th stalling event in the past. From these smoothness quality measures $S^k_n$, the playback smoothness quality assessment unit 604 computes the instantaneous smoothness quality measure $S_n$ at time n that takes into account of all stalling events (past and current), for example, by adding all smoothness quality measures $S^k_n$ as in Eq. (7). Both the instantaneous video presentation quality measure $P_n$ and the instantaneous smoothness quality measure $S_n$ are sent to the QoE assessment unit 606 to combine into an instantaneous QoE measure 114, for example, by adding these two quality measures according to Eq. (10), by multiplying the two measures, by weighted summation of the two measures, or by taking the maximum or minimum of the two quality measures. This instantaneous QoE measure may be provided, as output of the system 600, to other systems for further processing or utilization. For example, such QoE measure may be used as a feedback to the streaming video server, to inform it the perceived quality at the client side, in order to optimize media streaming systems and services. Or, it may be provided to a monitoring system for monitoring or recording the QoE measure as the perceived quality at the client side. Additionally, this instantaneous QoE measure may be provided to end-of-process QoE accumulation unit 608, to combine the instantaneous QoE measures at each frame over the entire monitored session into a single quantity, namely, an end-of-process QoE measure, that indicates (i.e., to use as an estimate of) the QoE for the entire monitored session.

Various embodiments of the invention have now been described in detail. Those skilled in the art will appreciate that numerous modifications, adaptations and variations may be made to the embodiments without departing from the scope of the invention, which is defined by the appended claims. The scope of the claims should be given the broadest interpretation consistent with the description as a whole and not to be limited to these embodiments set forth in the examples or detailed description thereof.

What is claimed is:

1. A method of generating a quality-of-experience (QoE) measure of a streaming session of streaming video, the streaming video being transmitted from a video hosting server at server side to a user viewing device at receiver side over a network connection, the method comprising:
    obtaining a presentation quality measure of the streaming video,
    tracking occurrences of all stalling events during the streaming session,
    obtaining a playback smoothness quality measure of the streaming video, the playback smoothness quality measure being assessed at the receiver side by combining contributions from all stalling events since the start of the streaming session, contribution from a stalling event being computed from the expression $$S^k(t) = \begin{cases} Qd(t), & \text{during stalling event} \\ Qd\left(\frac{i_k + l_k}{f}\right)m(t), & \text{after stalling event} \\ 0, & \text{prior to stalling event} \end{cases}$$

wherein the stalling event is the k-th stalling event that starts at $i_k$ and has a length $l_k$, the stalling occurred during the period $[i_k, i_k+l_k]$, f is the frame rate of the streaming video in frames/second, d(t) is a quality decay function that monotonically decreases with time t, m(t) is a memory function that monotonically decreases with t and Q is a measure of presentation quality of the streaming video prior to the occurrence of the stalling event, and
  generating an instantaneous QoE score by combining the presentation quality measure and the playback smoothness quality measure.

2. The method of claim 1, further comprising:
    cumulating instantaneous QoE scores generated at all time positions since the start of the streaming session to obtain an overall end-of-process QoE score of the streaming session.

3. The method of claim 1, wherein the contribution of the stalling event is computed based on the presentation quality immediately prior to the occurrence of the stalling event.

4. The method of claim 1, wherein a function monotonically decreasing with and saturating over time is used to represent the memory effect or the quality decay effect.

5. The method of claim 1, wherein the playback smoothness quality measure is evaluated utilizing time positions and durations of initial buffering and playback stalling events.

6. The method of claim 5, wherein the playback smoothness quality measure during a stalling event is evaluated utilizing the presentation quality measure of last rendered video frame before the start of the stalling event.

7. The method of claim 1, wherein the quality decay function d(t) has the form $$d(t) = -1 + \exp\left\{-\left(\frac{tf - i_k}{T_0}\right)\right\}$$

and the memory function m(t) has the form $$m(t) = \exp\left\{-\left(\frac{tf - i_k - l_k}{T_1}\right)\right\}$$

for time t in the k-th stalling event, where $T_0$ and $T_1$ ($T_1 > T_0$) are two parameters selected to represent the rate of dissatisfaction and the relative strength of memory, respectively.

8. The method of claim 1, wherein the playback smoothness quality measure is combined from the contributions due to all stalling events by adding the contributions from the individual stalling events.

9. The method of claim 8, wherein the presentation quality measure and the playback smoothness quality measure are combined to generate the instantaneous QoE score by multiplying the two quality measures, by weighted summation of the two quality measures, or by taking the maximum or minimum of the two quality measures.

10. The method of claim 1, wherein either the presentation quality measure is generated from a full-reference video quality assessment method, the full-reference video quality assessment method comparing quality of a test video generated from an original source of the streaming video with that of the original source video as a reference, or the presentation quality measure is generated from a no-reference video quality assessment method that requires no access to the original source video.

11. The method of claim 1, wherein the presentation quality measure is either generated at the server side and transmitted to the receiver side over the network connection or generated at the receiver side, or is generated by a networked server.

12. The method of claim 11, wherein the networked server receives parameters describing the user viewing device and viewing conditions of an end user and the presentation quality measure is generated using a video quality assessment method having viewing device and viewing condition adaptability.

13. The method of claim 1, further comprising the step of measuring an end-of-process user QoE by cumulating the instantaneous QoE measures over the streaming session.

14. A system for measuring user quality-of-experience (QoE) of streaming video, the streaming video being transmitted from a video hosting server at server side to a user viewing device at receiver side over a network connection, the system comprising:
- a presentation quality assessment unit, the presentation quality assessment unit generating or obtaining a presentation quality measure of the streaming video;
- a playback smoothness quality assessment unit, the playback smoothness quality assessment unit tracking occurrences of all stalling events during a streaming session and generating a playback smoothness quality measure of playback smoothness quality perceived at the user viewing device playing back the streaming video, wherein the generation of the smoothness quality measure combines contributions from all stalling events since the start of the streaming session, contribution from a stalling event being computed from the expression $$S^k(t) = \begin{cases} Qd(t), & \text{during stalling event} \\ Qd\left(\frac{i_k + l_k}{f}\right)m(t), & \text{after stalling event} \\ 0, & \text{prior to stalling event} \end{cases}$$

wherein the stalling event is the k-th stalling event that starts at $i_k$ and has a length $l_k$, the stalling occurred during the period $[i_k, i_k+l_k]$, f is the frame rate of the streaming video in frames/second, d(t) is a quality decay function that monotonically decreases with time t, m(t) is a memory function that monotonically decreases with t and Q is a measure of presentation quality of the streaming video prior to the occurrence of the stalling event, and
- a QoE assessment unit, the QoE assessment unit combining the presentation quality measure and the playback smoothness quality measure into an instantaneous QoE score.

15. The system of claim 14, further comprising an end-of-process QoE unit, the end-of-process QoE unit cumulating all instantaneous QoE scores and combining them into a single overall end-of-process QoE score of the streaming session.

16. The system of claim 14, wherein the presentation quality assessment unit is integrated into the video hosting server and the presentation quality assessment unit computes contribution of the stalling event based on the presentation quality measure of a video frame prior to the occurrence of the stalling event.

17. The system of claim 14, further comprising a networked server and wherein the presentation quality assessment unit or the playback smoothness quality assessment unit is integrated into the networked server.

18. The system of claim 17, wherein the networked server is an edge sever at the receiver side to obtain the presentation quality measure transmitted from the server side or to generate the presentation quality measure at the receiver side.

19. The system of claim 17, wherein the networked server receives parameters describing the user viewing device and viewing conditions of an end user and the presentation quality measure is generated using a video quality assessment method having viewing device and viewing condition adaptability.

20. The system of claim 14, wherein the playback smoothness quality assessment unit uses a function monotonically decreasing with and saturating over time to represent the memory effect or to represent the quality decay effect.

21. The system of claim 14, wherein the playback smoothness quality assessment unit evaluates the playback smoothness quality measure utilizing time positions and durations of initial buffering and playback stalling events.

22. The system of claim 14, wherein Q is the presentation quality measure of the last fully rendered frame prior to the occurrence of the stalling event, $P_{i_k-1}$.

23. The system of claim 14, wherein the quality decay function d(t) has the form $$d(t) = -1 + \exp\left\{-\left(\frac{tf - i_k}{T_0}\right)\right\}$$

and the memory function m(t) has the form $$m(t) = \exp\left\{-\left(\frac{tf - i_k - l_k}{T_1}\right)\right\}$$

for time t in the k-th stalling event, where $T_0$ and $T_1$ ($T_1 > T_0$) are two parameters selected to represent the rate of dissatisfaction and the relative strength of memory, respectively.

24. The system of claim 14, wherein the QoE assessment unit is configured to add the contributions from the individual stalling events to obtain the playback smoothness quality measure.

25. The system of claim 24, wherein the QoE assessment unit is configured to add the presentation quality measure and the playback smoothness quality measure to generate the instantaneous QoE score.

26. The system of claim 24, wherein the QoE assessment unit is configured to generate the instantaneous QoE score by multiplying the presentation quality measure and the playback smoothness quality measure, by weighted summation of the two quality measures, or by taking the maximum or minimum of the two quality measures.

27. The system of claim 14, wherein the presentation quality assessment unit either is configured to generate the presentation quality measure from a full-reference video quality assessment method, the full-reference video quality assessment method comparing quality of a test video generated from an original source of the streaming video with that of the original source video as a reference, or is configured to generate the presentation quality measure from a no-reference video quality assessment method that requires no access to the original source video.

28. The system of claim 27, wherein, where the full-reference video quality assessment method is used, the test video has spatial and/or temporal resolutions different from those of the reference video.

29. A non-transitory computer-readable medium having stored thereon computer readable code that when executed by a processor of a computing device, causes the computing device to perform a method of measuring user quality-of-experience of streaming video, according to claim 1.

30. The non-transitory computer-readable medium of claim 29, wherein the method of measuring user quality-of-experience of streaming video further comprises cumulating instantaneous QoE scores generated at all time positions since the start of the streaming session to obtain an overall end-of-process QoE score of the streaming session.

31. The non-transitory computer-readable medium of claim 29, wherein the contribution of the stalling event is computed based on the presentation quality immediately prior to the occurrence of the stalling event.

32. The system of claim 14, wherein the playback smoothness quality assessment unit is configured to compute the contribution of the stalling event based on the presentation quality immediately prior to the occurrence of the stalling event.

33. The system of claim 17, wherein the networked server is a cloud server that obtains the presentation quality measure transmitted from the server side.

* * * * *